Patented Apr. 11, 1950

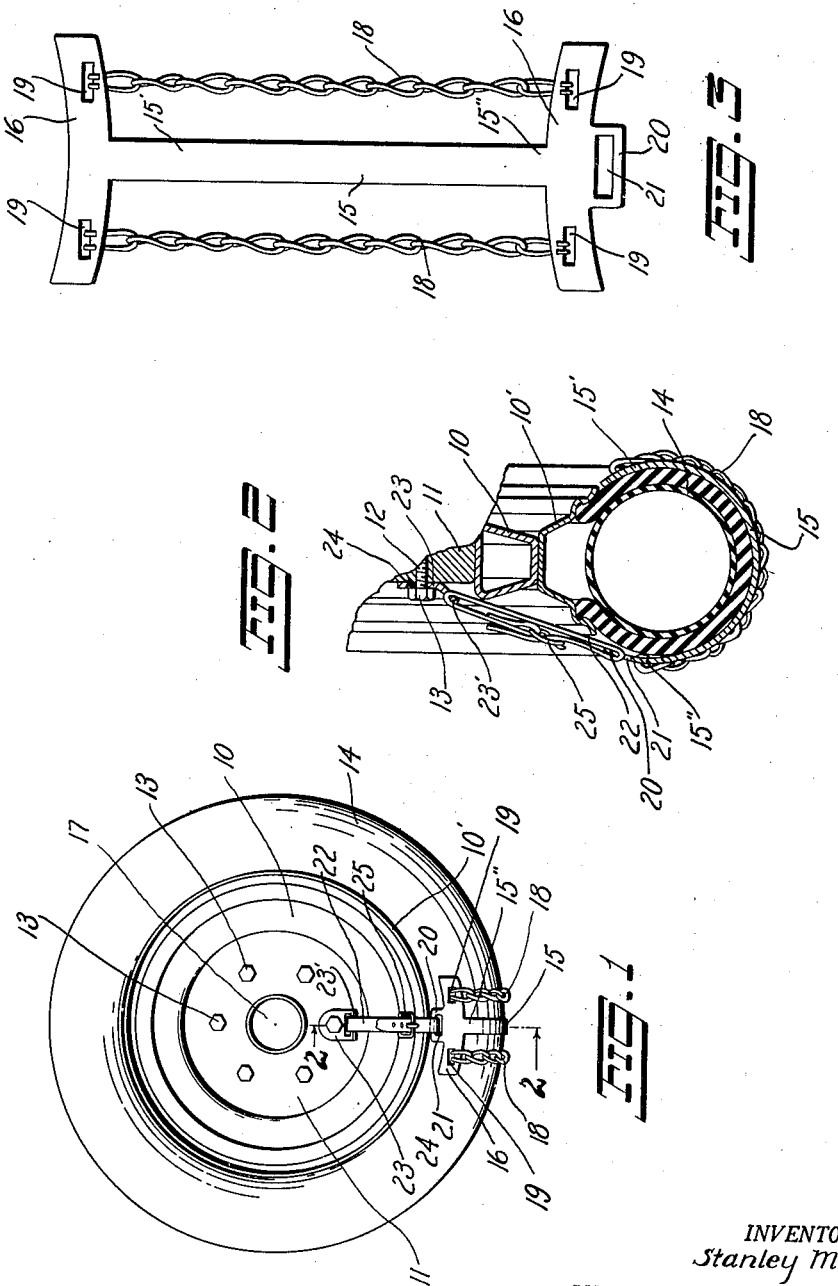

2,503,399

UNITED STATES PATENT OFFICE 2,503,399

ANTISKID ATTACHMENT FOR VEHICLE WHEELS

Stanley Maas, Beechhurst, N. Y.

Application March 15, 1947, Serial No. 734,899

5 Claims. (Cl. 152—223)

This invention relates to anti-skid attachments to be associated with vehicle wheels and proposes a device so constructed that one or more thereof may be readily applied to or removed from a wheel without the necessity of moving or rolling the vehicles, or of bodily elevating it to free the wheel from contact with the ground.

Among its other objects the instant invention contemplates an anti-skid attachment which partakes of the operative characteristics of a standard or conventional skid chain but which does not have the usual limitations thereof, especially those respecting the adaptability thereof to but one size or range of sizes of wheel and/or tire. In short the present attachment has in view the application and adaptability thereof to substantially all wheel and tire sizes at the same time maintaining secure interengagement between the tire and the anti-skid device.

By employing a tire embracing clamp or clamping member in combination with a single additional means of securing the attachment to the wheel or tire this invention obviates the necessity of any adjustment or manipulation on both sides of the wheel and allows the entire attachment to be positioned solely from the outer or exposed face of the wheel.

With the above and other objects in view, as will be apparent, this invention consists in the construction, combination and arrangement of parts all as hereinafter more fully described, claimed and illustrated in the accompanying drawings, wherein:

Fig. 1 is an outside elevation of a vehicle wheel and associated tire showing the present anti-skid attachment applied thereto;

Fig. 2 is a section taken along line 2—2 of Fig. 1 through the tire and part of the wheel to illustrate the coaction between the instant attachment and the tire, as well as the single, adjustable means by which it is secured to the wheel; and Fig. 3 is a developed or flat view of the clamp or clamping member which carries and supports the anti-skid elements of the attachment and which embraces the tire and spans the tread thereof when the device is in its operative position.

Heretofore a multitude of different types of anti-skid devices have been developed and used on wheeled vehicles and of these prior devices the two most commonly employed have been (1) the skid chain consisting of one or more carrying chains or members on each side of the wheel and tire in combination with a plurality of transverse chains or members interposed therebetween to span and bear on the tread of the tire, and (2) the independent block or chain associated with the tread of the tire and held in place by a flexible supporting member, secured to the ends of the chain or block and threaded between adjoining spokes of the wheel to bear against the inner face of the felly thereof. While the skid chain has some degree of adjustability it customarily is designed to fit but one size or a limited range of sizes of tire and wheel and in any event requires either the jacking up or the rolling of the vehicle for its application to the wheel and tire, as well as the adjustment and securing of the supporting chains or members adjacent both faces or sides of the wheel. Though the independent block or chain, as above generally described is simpler and easier to mount than the skid-chain aforesaid its range of adaptability is relatively limited and its application to the tire and wheel requires operations and adjustments from both faces of the wheel.

The present invention proposes an anti-skid attachment which can be readily applied and adjusted to approximately any size of wheel and/or tire, that can be secured on and to the tire and wheel from only one side or face of the wheel, and which after adjustment and attachment will have no loose ends of its components that may dangerously dangle and at best hit and contact road and fenders to produce annoying and objectionable noises. Moreover the instant attachment has at least all of the operating characteristics and advantages of the anti-skid devices prior hereto and yet more snugly engages the tire and is simpler and easier to attach and remove.

In the drawing 10 denotes a conventional vehicle wheel, more or less schematically illustrated, attached to its hub 11 by a circular, concentric series of bolts 12 and coacting nuts 13. The tire 14 may be mounted on the felly 10' of the wheel 10 in any manner and there held by any adaptable means. The construction of the wheel 10 and the means for mounting the tire 14 thereon form no part of the present invention and therefore are to be considered only descriptive or environmental.

The instant invention proposes a clamping member 15 of spring steel or other suitable and equivalent material which is preformed to the general transverse contour of the tire 14 so that it may snugly embrace and adhere to such contour as shown in Fig. 2. After the clamp or clamping member 15 has engaged the tire 14 its length should be such that its medial or central portion lies flat or flush against the tread of the tire with its inner end 15' positioned adjoining the felly 10' and above the horizontal diameter of the tire, and with the opposite end 15" located against the outer face of the tire 14 somewhat removed from the felly 10' but above its horizontal diameter. The resiliency or spring of the material of which the clamp or clamping member 15 is made is such that its ends 15' and 15" may be temporarily separated to admit the tire between them and permit the engagement over a tire of almost any standard size. The release of the ends allows the device to firmly but elastically grip the tire between them with the central portion between the ends resting flush against the tire tread.

At each of its ends 15' and 15" the clamp or clamping member 15 is provided with a transverse arm 16 formed integrally with the member 15. These arms 16 are curved longitudinally so that when the device is in its operative position on the tire 14 they rest approximately concentric to both the tread of the tire 14 and the axis 17 of the wheel 10.

The anti-skid elements 18, here shown as chains, are interposed between corresponding ends of the arms 16 and when so mounted generally parallel the clamp or clamping member 15. For that purpose the end portions of the arms 16 are pierced by similarly positioned slots 19 in which the ends of the elements 18 are secured.

It is possible that the device as just described could, by reason of its spring or resilience, so grip and engage the tire 14 as to resist all of the ordinary forces tending to displace it. However, as insurance against any possibility of accidental displacement the outer extremity 15" of the member 15 has an elongated ear 20 formed integrally therewith exteriorly of the arm 16 and in opposition to the member 15 at that end of the device. This ear 20 is centrally slotted, as at 21, for the reception of an attaching strap 22.

For cooperation with a bolt 12 and with the strap 22 a plate 23 having a slot 24 at one end and a central aperture 24 in its opposite end is provided. The slotted end 23' of this plate 23 is angularly disposed with respect to the remainder of the plate so that when a bolt 12 is received in the aperture 24 and a nut 13 engages the threaded end thereof the plate 22 is clamped flush against the hub 11 with the slotted end portion 23' projecting outwardly at an angle.

The attaching strap 22 is looped through the slots 21 and 24 respectively of the clamp or clamping member 15 and the plate 23 and has a buckle or other fastening means 25 at one of its ends for coaction with the other of its ends. By adjustment of the length of the attaching strap 22 through the means mutually securing its contiguous ends one to the other the distance between plate 23 and the outer end 15" of the member 15 may be determined. Thus when installed any tendency the device or attachment may have to be displaced will be counteracted by the strap 22.

Ordinarily the concentric series of bolts 13 and associated elements are concealed by a removable plate. Since this plate has no relation to the present invention it is not shown. However it is to be noted that when this plate is present in the wheel assembly it is removed to permit the application of the present attachment to the wheel and tire.

What is claimed is:

1. An anti-skid device for association with a wheel and tire mounted thereon comprising a clamping member of spring metal preformed to resiliently engage and closely follow the transverse contour of the tire, a transversely projecting arm at each end of said member, flexible anti-skid elements interposed between corresponding ends of said arms to rest parallel one to the other and to said member, and an adjustable strap to be interposed between one end of said member and the wheel.

2. An anti-skid device for association with a wheel and tire mounted thereon comprising a clamping member of spring metal preformed to span the tire tread and closely follow its transverse contour and terminate inwardly of the horizontal diameter of the tire, a transverse arm integral with and projecting from each side of said member adjoining each of its ends, the projecting portions of said arms being provided with slots, chains substantially parallel to said member and having their ends engaged in the slots of said arms, a slotted ear integral with one end of said member, a plate including means for securing it to the wheel and having a slot, and an adjustable strap threaded through the slots of the ear and plate.

3. An anti-skid device for cooperation with a wheel and tire comprising a clamping member of spring metal preformed to closely follow the transverse contour of the tire to terminate adjacent the wheel felly and clampingly engage the tire between its ends, a transversely projecting arm integral with each end of said member, the projecting end portions of each arm being longitudinally slotted, flexible anti-skid elements interposed between and secured in the slots of the corresponding end portions of said arms, a slotted ear integral with one end of said clamping member and disposed exteriorly of the adjacent transverse arm, a slotted plate associated with said ear and embodying means whereby it may be removably attached to said wheel, and adjustable means operating through the slots of said ear and plate for securing the clamping member to said wheel.

4. An anti-skid device for cooperation with a wheel and tire comprising a clamping member of spring metal preformed to closely follow the transverse contour of the tire and clampingly engage the tire between its ends, a transversely projecting arm integral with each end of said member, the projecting end portions of each arm being longitudinally slotted, flexible anti-skid elements interposed between and secured in the slots of the corresponding end portions of said arms, a slotted ear integral with one end of said clamping member and disposed exteriorly of the adjacent transverse arm, a plate associated with the eared end of said member having a mounting opening at one end for cooperation with the wheel and its opposite end slotted and disposed at an angle to the remainder of said plate, and a continuous strap threaded through the slots of the ear and plate and provided with means whereby the contiguous ends thereof may be adjustably secured one to the other.

5. An anti-skid device for association with a wheel and tire mounted thereon comprising a clamping member of spring metal preformed to resiliently engage and closely follow the transverse contour of the tire and to be held in place on the tire by the resilient clamping engagement thereof by said member, a transversely projecting arm at each end of said member, flexible anti-skid elements interposed between corresponding ends of said arms to rest substantially parallel one to the other and to said member, and means interposed between one end of said member and the wheel to supplement the resiliency of the clamping member in holding the device in its operative position on the tire.

STANLEY MAAS.

REFERENCES CITED

The following references are of record in the file of this patent:

UNITED STATES PATENTS

| Number | Name | Date |
|---|---|---|
| 1,627,025 | Fisher | May 3, 1927 |
| 1,879,584 | St. Pierre | Sept. 27, 1932 |
| 2,119,447 | Stahl | May 31, 1938 |
| 2,154,047 | Krider | Apr. 11, 1939 |